(12) United States Patent
Kukkonen et al.

(10) Patent No.: US 9,434,615 B2
(45) Date of Patent: Sep. 6, 2016

(54) METHOD AND APPARATUS FOR PRODUCING LIQUID BIOFUEL FROM SOLID BIOMASS

(75) Inventors: Petri Kukkonen, Helsinki (FI); Pekka Knuuttila, Porvoo (FI); Pekka Jokela, Espoo (FI)

(73) Assignee: UPM-KYMMENE OYJ, Helsinki (FI)

( * ) Notice: Subject to any disclaimer, the term of this patent is extended or adjusted under 35 U.S.C. 154(b) by 1240 days.

(21) Appl. No.: 12/669,769

(22) PCT Filed: Jul. 18, 2008

(86) PCT No.: PCT/EP2008/059441
§ 371 (c)(1),
(2), (4) Date: Aug. 20, 2010

(87) PCT Pub. No.: WO2009/013233
PCT Pub. Date: Jan. 29, 2009

(65) Prior Publication Data
US 2010/0305220 A1 Dec. 2, 2010

(30) Foreign Application Priority Data

Jul. 20, 2007 (FI) .................................. 20075557
Apr. 30, 2008 (FI) .................................. 20085400

(51) Int. Cl.
*B01J 8/18* (2006.01)
*C07C 27/00* (2006.01)
(Continued)

(52) U.S. Cl.
CPC . *C01B 3/48* (2013.01); *C01B 3/38* (2013.01); *C01B 3/52* (2013.01); *C10G 2/32* (2013.01); *C10J 3/503* (2013.01); *C10J 3/721* (2013.01); *C10J 3/84* (2013.01); *C10K 1/002* (2013.01); *C10K 1/005* (2013.01); *C10K 1/006* (2013.01); *C10K 1/101* (2013.01); *C10K 1/143* (2013.01);
(Continued)

(58) Field of Classification Search
USPC .................. 48/61, 197 R; 518/700, 702, 703
See application file for complete search history.

(56) References Cited

U.S. PATENT DOCUMENTS

| 1,746,464 A | 2/1930 | Fischer et al. |
| 6,596,780 B2 | 7/2003 | Jahnke et al. |

(Continued)

FOREIGN PATENT DOCUMENTS

| WO | 2006043112 A1 | 4/2006 |
| WO | 2008011000 A1 | 1/2008 |

OTHER PUBLICATIONS

"Nickel" Wikipedia, the free encyclopedia; Retrieved from http://en.wikipedia.org/w/index.php? title=Nickel&oldid=663056202 on May 26, 2015, 18 pages.

(Continued)

Primary Examiner — Kaity Handal
(74) Attorney, Agent, or Firm — Cantor Colburn LLP (57) ABSTRACT

The invention relates to a method and apparatus for producing liquid hydro carbonaceous product (1) such as biofuel from solid biomass (2). The method comprises a gasifying step for gasifying solid biomass (2) in a gasifier (6) to produce raw synthesis gas (3), conditioning of the raw synthesis gas (3) to purify the raw synthesis gas (3) to obtain purified synthesis gas (4) having a molar ratio of hydrogen to carbon monoxide between 2.5 to 1 and 0.5 to 1, preferably to between 2.1 to 1 and 1.8 to 1, more preferably about 2 to 1, and subjecting purified synthesis gas (4) to a Fischer-Tropsch synthesis in a Fischer-Tropsch reactor (5) to produce liquid hydro carbonaceous product (1).

35 Claims, 4 Drawing Sheets

(51) Int. Cl.
- *C01B 3/48* (2006.01)
- *C01B 3/38* (2006.01)
- *C01B 3/52* (2006.01)
- *C10G 2/00* (2006.01)
- *C10J 3/50* (2006.01)
- *C10J 3/72* (2006.01)
- *C10J 3/84* (2006.01)
- *C10K 1/00* (2006.01)
- *C10K 1/10* (2006.01)
- *C10K 1/14* (2006.01)
- *C10K 3/04* (2006.01)
- *C10K 3/02* (2006.01)

(52) U.S. Cl.
CPC ............... *C10K 3/023* (2013.01); *C10K 3/04* (2013.01); *C01B 2203/0233* (2013.01); *C01B 2203/0283* (2013.01); *C01B 2203/0415* (2013.01); *C01B 2203/0475* (2013.01); *C01B 2203/1235* (2013.01); *C10G 2300/1011* (2013.01); *C10G 2300/202* (2013.01); *C10G 2300/4081* (2013.01); *C10G 2300/44* (2013.01); *C10G 2300/807* (2013.01); *C10J 2300/0903* (2013.01); *C10J 2300/0916* (2013.01); *C10J 2300/0959* (2013.01); *C10J 2300/0973* (2013.01); *C10J 2300/1618* (2013.01); *C10J 2300/1659* (2013.01); *C10J 2300/1807* (2013.01); *C10J 2300/1838* (2013.01); *C10J 2300/1884* (2013.01); *Y02E 50/32* (2013.01); *Y02P 20/145* (2015.11); *Y02P 30/20* (2015.11)

(56) References Cited

U.S. PATENT DOCUMENTS

| | | | |
|---|---|---|---|
| 7,214,720 | B2 | 5/2007 | Bayle et al. |
| 7,235,172 | B2 | 6/2007 | Lawson et al. |
| 2003/0083391 | A1 | 5/2003 | Jahnke et al. |
| 2003/0211940 | A1* | 11/2003 | Van Berge et al. ......... 502/325 |
| 2005/0112739 | A1 | 5/2005 | Golubkov |
| 2005/0187415 | A1 | 8/2005 | Lawson et al. |
| 2005/0250862 | A1 | 11/2005 | Bayle et al. |
| 2005/0261382 | A1* | 11/2005 | Keyser ............ C01B 3/36 518/702 |
| 2006/0149423 | A1* | 7/2006 | Barnicki ............ C10J 3/00 700/286 |
| 2007/0011945 | A1 | 1/2007 | Grootveld et al. |
| 2007/0100003 | A1 | 5/2007 | Holley et al. |
| 2007/0129450 | A1* | 6/2007 | Barnicki ............ C10G 2/30 518/704 |
| 2008/0021121 | A1* | 1/2008 | Norbeck ............ C01B 3/38 518/704 |
| 2008/0161428 | A1 | 7/2008 | Strait |
| 2010/0051875 | A1* | 3/2010 | Chornet et al. ............ 252/373 |
| 2010/0074829 | A1* | 3/2010 | Koss ............ 423/437.2 |

OTHER PUBLICATIONS

Gunardson, Harold H. "Synthesis Gas Manufacture", Industrial Gases in Petrochemical Processing, 1997, pp. 43-57.

Nichel. (1968). In the Merck Index, An Encyclopedia of Chemicals and Drugs, (8th Edition, p. 727). Rahway, NJ: Merck & CO., Inc.

Catalyst Handbook. Ed. Martyn V. Twigg. 2nd ed. London: Wolfe Publishing Ltd., 1989. pp. 228 and 278.

Luo, L. et al., "Properties of Biomass-Derived Biochars: Combined Effects of Operating Conditions and Biomass Types", Bioresource Technology 192, (2015) pp. 83-89.

Murzin, Dmitry Yu., Engineering Catalysis, "Preparation of catalytic materials", 2013 Walter de Gruyter GmbH, Berlin/Boston; p. 101.

Written Opinion of the International Searching Authority; International Application No. PCT/EP2008/059441; International Filing date Jul. 18, 2008; 7 pages.

* cited by examiner

METHOD AND APPARATUS FOR PRODUCING LIQUID BIOFUEL FROM SOLID BIOMASS

CLAIM OF PRIORITY

This application claims priority under 35 USC 371 to International Application No. PCT/EP2008/059441, filed on Jul. 18, 2008, which claims priority to Finland Application Serial No. 20075557, filed Jul. 20, 2007, and Finland Application Serial No. 20085400, filed Apr. 30, 2008, each of which is incorporated by reference in its entirety.

FIELD OF THE INVENTION

The invention relates to a method for producing liquid hydro carbonaceous product such as liquid biofuel from solid biomass as defined in the preamble of independent claim 1.

The invention also relates to an apparatus for producing liquid hydro carbonaceous product such as liquid biofuel from solid biomass as defined in the preamble of independent claim 18.

The invention relates to a method and apparatus for producing liquid biofuel from solid biomass, in other words to a biomass to liquid (BTL) process. Several processes for the production of liquid biofuel from solid biomass including a Fischer-Tropsch type process are known in the art. The Fischer-Tropsch process is for example described in U.S. Pat. No. 1,746,464.

Publication US 2005/0250862 A1 relates to an installation and a process for the production of liquid fuels starting from a solid feedstock that contains organic material. In the process the solid feedstock is pyrolyzed and gasified so as to convert said feedstock into synthesis gas. The thus formed synthesis gas is further gasified in a secondary gasification zone at a temperature above 1000° C. after which the synthesis gas is purified. The purified synthesis gas is converted with Fischer-Tropsch-type synthesis to a liquid effluent and a gaseous effluent and the liquid effluent is fractionated so as to obtain a gaseous fraction, a naphtha fraction, a kerosene fraction and a gas oil fraction. At least a portion of the naphtha fraction is recycled in gasification stage.

Publication WO 2006/043112 presents a process and a plant for treating solid biomass to generate electricity and to provide a liquid hydrocarbon which may be used as a fuel. Solid biomass such as wood chips are supplied to a fluidized bed gasifier, while also feeding a gas stream comprising air and hot steam at above 800° C. into the gasifier to fluidize the bed of solid material. The hot gas mixture produced from the gasifier may be cooled so as to generate high-pressure steam to drive a turbine. The gas mixture is preferably cooled to below 100° C., compressed to at least 1.7 MPa, and then subjected to a Fischer-Tropsch synthesis. This generates a liquid hydrocarbon product and tail gases. The hot gas stream for the gasifier may be provided by subjecting the tail gases to combustion in a compact catalytic reactor heat exchanger.

Publication WO 2008/011000 presents a method and an apparatus for converting carbonaceous material to a stream of methane and carbon monoxide rich gas by heating the carbonaceous material in a fluidized bed reactor using hydrogen as fluidizing medium and using steam, under reducing conditions at a temperature and pressure sufficient to generate a stream of methane and carbon monoxide rich gas but at a temperature low enough and/or at a pressure high enough to enable the carbonaceous material to be fluidized by the hydrogen. In particular embodiments, the carbonaceous material is fed as a slurry feed, along with hydrogen, to a kiln type reactor before being fed to the fluidized bed reactor. The method may include a step of subjecting the stream of methane and carbon monoxide rich gas to steam methane reforming under conditions whereby synthesis gas comprising hydrogen and carbon monoxide is generated. Synthesis gas generated by the steam methane reforming may be fed into a Fischer-Tropsch type reactor under conditions whereby a liquid fuel is produced.

OBJECTIVE OF THE INVENTION

The object of the invention is to provide a new and inventive method and apparatus for the production of liquid biofuel from solid biomass.

SHORT DESCRIPTION OF THE INVENTION

The method for producing a liquid hydro carbonaceous product such as biofuel from solid biomass of the invention is characterized by the definitions of independent claim 1.

Preferred embodiments of the method are defined in the dependent claims 2 to 17.

The apparatus for producing liquid hydro carbonaceous product such as biofuel from solid biomass of the invention is correspondingly characterized by the definitions of independent claim 18.

Preferred embodiments of the apparatus are defined in the dependent claims 19 to 34.

As raw material for the method and apparatus of the invention almost any kind of solid biomass is suitable that can be gasified. The solid biomass is typically selected from virgin and waste materials of plant, animal and/or fish origin, such as municipal waste, industrial waste or by-products, agricultural waste or by-products (including also dung), waste or by-products of the wood-processing industry, waste or by-products of the food industry, marine plants (such as algae) and combinations thereof. The solid biomass material is preferably selected from non-edible resources such as non-edible wastes and non-edible plant materials, including oils, fats and waxes. A preferred solid biomass material according to the present invention comprises waste and by-products of the wood-processing industry such as residue, urban wood waste, lumber waste, wood chips, sawdust, straw, firewood, wood materials, paper, by-products of the papermaking or timber processes, short rotation crops etc. The solid biomass material for the process may also comprise vegetable oils, animal fats, fish oils, natural waxes, and fatty acids.

As a liquid raw material for the method and apparatus of the invention almost any kind of liquid biomass that can be gasified can be used. The liquid biomass material for the process may be selected vegetable oils, such as tall oil, palm oil, animal fats, fish oils, natural waxes, fatty acids, biomethanol, black liquor, linguine, pyrolysis oil and glycerol.

The invention comprises a gasification step for gasifying solid biomass in a gasifier to produce raw synthesis gas comprising carbon monoxide and hydrogen. Raw synthesis gas means in this context that the synthesis gas in addition to carbon monoxide and hydrogen also can comprise "impurities" such as $CO_2$ (carbon dioxide), $CH_4$ (methane), $H_2O$ (water), $N_2$, (nitrogen), $H_2S$ (hydrogen sulfide), $NH_3$ (ammonia), HCl (hydrogen chloride), tar, and small particles such as ash and soot. The raw synthesis gas is conditioned to purify the raw synthesis gas to obtain purified synthesis gas suitable for a Fischer-Tropsch type synthesis. Conditioning of the raw synthesis gas means for example that the purified synthesis gas has a molar ratio of hydrogen to carbon monoxide between 2.5 to 1 and 0.5 to 1, preferably to between 2.1 to 1 and 1.8 to 1, more preferably about 2 to 1. The purified synthesis gas is subjected to a Fischer-Tropsch type synthesis in a Fischer-Tropsch reactor to produce liquid hydro carbonaceous product of the purified synthesis gas.

In a preferred embodiment of the invention a gasifier comprising a fluidized bed reactor, for example a circulating fluidized bed reactor or bubbling fluidized bed reactor is utilized for gasifying solid biomass. In this preferred embodiment oxygen and steam and possible also tail gas from the Fischer-Tropsch reactor is used as gasification and fluidizing medium in the fluidized bed reactor. When oxygen is used as gasification and fluidizing medium, the Fischer-Tropsch synthesis is more effective than if air would be used as fluidizing medium. In prior art methods using air as fluidizing medium such as in the process of WO 2006/043112, the fluidizing air contains inert components, such as nitrogen which must be removed before the Fischer-Tropsch synthesis.

In a preferred embodiment of the invention a lock hopper is used for feeding solid biomass into the gasifier.

In a preferred embodiment of the invention the conditioning of the raw synthesis gas to produce purified synthesis gas comprises a sequence of conditioning steps in which various kind of conditioning of the raw synthesis gas is performed for the conditioning of the raw synthesis gas obtained in the gasification step to purify the raw synthesis gas to obtain purified synthesis gas suitable for a Fischer-Tropsch type synthesis. This means for example that the purified synthesis gas has a molar ratio of hydrogen to carbon monoxide between 2.5 to 1 and 0.5 to 1, preferably to between 2.1 to 1 and 1.8 to 1, more preferably about 2 to 1. The conditioning is conducted a means for conditioning of the raw synthesis gas that is formed by a sequence of conditioning apparatuses for performing various kinds of conditioning step s. In other words, in a preferred embodiment of the apparatus of the invention, a sequence of conditioning apparatuses forming the means for conditioning of the raw synthesis gas is arranged between the gasifier and the Fischer-Tropsch reactor and the apparatus comprises conduit means for leading the raw synthesis from the gasifier sequently through the sequence of conditioning apparatuses to obtain purified synthesis gas that is finally fed into the Fischer-Tropsch reactor.

In a preferred embodiment of the invention a particle separation step is performed in a first particle separator preferably, but not necessarily, comprising a first cyclone for separating particles such as ash, char and bed material from the raw synthesis gas. In this preferred embodiment the particles separated from the raw synthesis gas by the first particle separator are preferably, but not necessarily, recirculated to the bottom of the gasifier. In another preferred embodiment of the invention, in addition to the particle separation step performed in the first particle separator, a dust separation step is performed in a second particle separator that preferably, but not necessarily, comprises a second cyclone for lowering the dust content of the raw synthesis gas.

In a preferred embodiment of the invention one of the conditioning steps is a catalytic treatment of the raw synthesis gas performed in a reformer for converting tar and methane present in the raw synthesis gas into carbon monoxide and hydrogen. Preferably, but not necessarily, catalysts comprising nickel are used in the reformer. Tar and methane reforming are endothermic chemical reactions. Therefore, in this preferred embodiment of the invention, oxygen and steam and possible also tail gas from the Fischer-Tropsch synthesis are preferably, but not necessarily, fed into the stream of raw synthesis gas flowing into the reformer to raise the temperature of the raw synthesis gas preferably to about 900° C. before the raw synthesis gas flows into the reformer. In a preferred embodiment of the invention, the reformer is arranged as the first conditioning apparatus in a sequence of conditioning apparatuses for purifying raw synthesis gas which sequence of conditioning apparatuses is arranged downstream of the gasifier and upstream of the Fischer-Tropsch reactor. By arranging the reformer as the first conditioning apparatus in a sequence of conditioning apparatuses, it is easy to set the temperature to the relatively high temperature range of about 900° C. for the catalytic treatment, because the temperature of the raw synthesis gas coming from the gasifier and entering the sequence of conditioning apparatuses is 750-850° C. Also, when compared to processes, where the reformer is arranged further away from the gasifier, after other conditioning steps, the temperature of the raw synthesis gas having thus a lower temperature, energy saving are achieved. In a preferred embodiment of the invention raw synthesis gas is after a catalytic treatment performed in a reformer cooled in a cooler for lowering the temperature of the raw synthesis gas to below 250° C.

In a preferred embodiment of the invention one of the conditioning steps is a filtering step for filtering the raw synthesis gas with a filter for removing particles such as ash and soot from the raw synthesis gas. The filter is preferably but not necessarily, a metallic or sinter candle filter. The filter is preferably arranged downstream of a cooler in a sequence of conditioning apparatuses, because if raw synthesis gases would be fed uncooled from the gasifier in to the filter, the temperature of the raw synthesis gas could cause the particles removed from the raw synthesis gas to sintrate or clog to the filter.

In a preferred embodiment of the invention one of the conditioning steps is a water-gas-shift reaction step performed in a water-gas-shift reactor for adjusting the molar ratio of hydrogen and carbon monoxide to between 2.5 to 1 and 0.5 to 1, preferably to between 2.1 to 1 and 1.8 to 1, more preferably to about 2 to 1. The water-gas-shift reactor is preferably arranged downstream of a filter in a sequence of conditioning apparatuses.

In a preferred embodiment of the method of the invention one of the conditioning steps is a scrubbing step for scrubbing, preferably water scrubbing, the raw synthesis gas to remove remaining solids and residual tar components but also HCl (hydrogen chloride), $NH_3$ (ammonia) and other components from the raw synthesis gas. The scubbing is conducted in a scrubber. The scrubber is preferably arranged downstream of a water-gas-shift reactor in a sequence of conditioning apparatuses.

In a preferred embodiment of the invention after the scrubbing step the raw synthesis gas is purified in an ultra purification for removing sulfur components, $CO_2$ (carbon dioxide), $H_2O$ (water), HCN (hydrogen cyanide), $CH_3Cl$ (methyl chloride), carbonyls, Cl (chloride) and $NO_x$ (nitrogen oxide) sulfur from the raw synthesis gas to improve the quality of the purified synthesis gas for the Fischer-Tropsch process. The purification is performed in an ultra purifiction means. In a preferred embodiment of the apparatus of the invention the ultra purification means are adapted for subjecting the raw synthesis gas to methanol or dimethyl ether at a high pressure, for example at about 30 to 40 bar, for example at about 35 bar, and at a low temperature, for example −25° C. to −60° C. High pressure and low temperature increase the solubility of sulfur components and carbon dioxide into the liquid solvent used to carry them away from the raw synthesis gas. Examples of usable processes for this step are the Rectisol® process by Lurgi AG or the Selexol™ by UOP LLP. In a preferred embodiment of the apparatus of the invention the ultra purification means is adapted for subjecting the raw synthesis gas to physical cleaning such as amine wash. In amine wash the raw synthesis gas is fed to the bottom of an absorber. In counter current flow the absorber can be heated up against regenerated solution, either directly or after flashing. Hot regenerated solution is used as heat source. Downstream, the solution is completely regenerated by reboiling while the acid gases are exported to an incinerator. The cooled, regenerated solution is again sent to the top of the absorber column. In the amine wash concept the COS compounds in the raw synthesis gas can be hydrolyzed to $H_2S$ before amine washing. In a preferred embodiment of the invention a compressor is arranged for raising the pressure of the raw synthesis gas to about 30 to 40 bar for example to about 35 bar pressure before leading the raw synthesis gas into the ultra purification means. The ultra purifiction means is preferably arranged downstream of a scrubber in a sequence of conditioning apparatuses.

In a preferred embodiment of the invention a guard bed reactor comprising preferably, but not necessarily, zinc oxide catalysts and/or active carbon is used for removing sulfur species from the synthesis gas prior feeding the purified synthesis gas into the Fischer-Tropsch reactor.

In a preferred embodiment of the invention several gasifiers are used for producing raw synthesis gas. In this preferred embodiment of the method of the invention at least one of the several gasifiers is a gasifier for producing raw synthesis gas from solid biomass and at least one of the several gasifiers is a gasifier for producing raw synthesis gas from liquid biomass. Using several gasifiers increases the uptime of the process because this makes possible an ongoing Fischer-Tropsch synthesis even if one of the gasifiers is not producing raw synthesis gas. Using several gasifies also increases the capacity of the process. Also combining gasifiers gasifying liquid and solid biomass helps in controlling the incoming biomass material flow.

In a preferred embodiment of the invention a product upgrading step utilizing product upgrading means for fractionation of the liquid hydro carbonaceous biofuel produced by the Fischer-Tropsch reactor to obtain at least a diesel fraction and at least a naptha fraction.

LIST OF FIGURES

In the following the invention will be described in more detail by referring to the figures, of which

In FIGS. 1 to 4 the same numerals refer to corresponding parts and they will not be explained separately later on, unless required by the illustration of the subject matter.

DETAILED DESCRIPTION OF THE INVENTION

The figures show preferred embodiments of the method according to the invention for producing a liquid hydro carbonaceous product 1 such as liquid biofuel from solid biomass 2 and preferred embodiments of the apparatus for producing a liquid hydro carbonaceous product 1 such as liquid biofuel from solid biomass 2.

Figure 1:
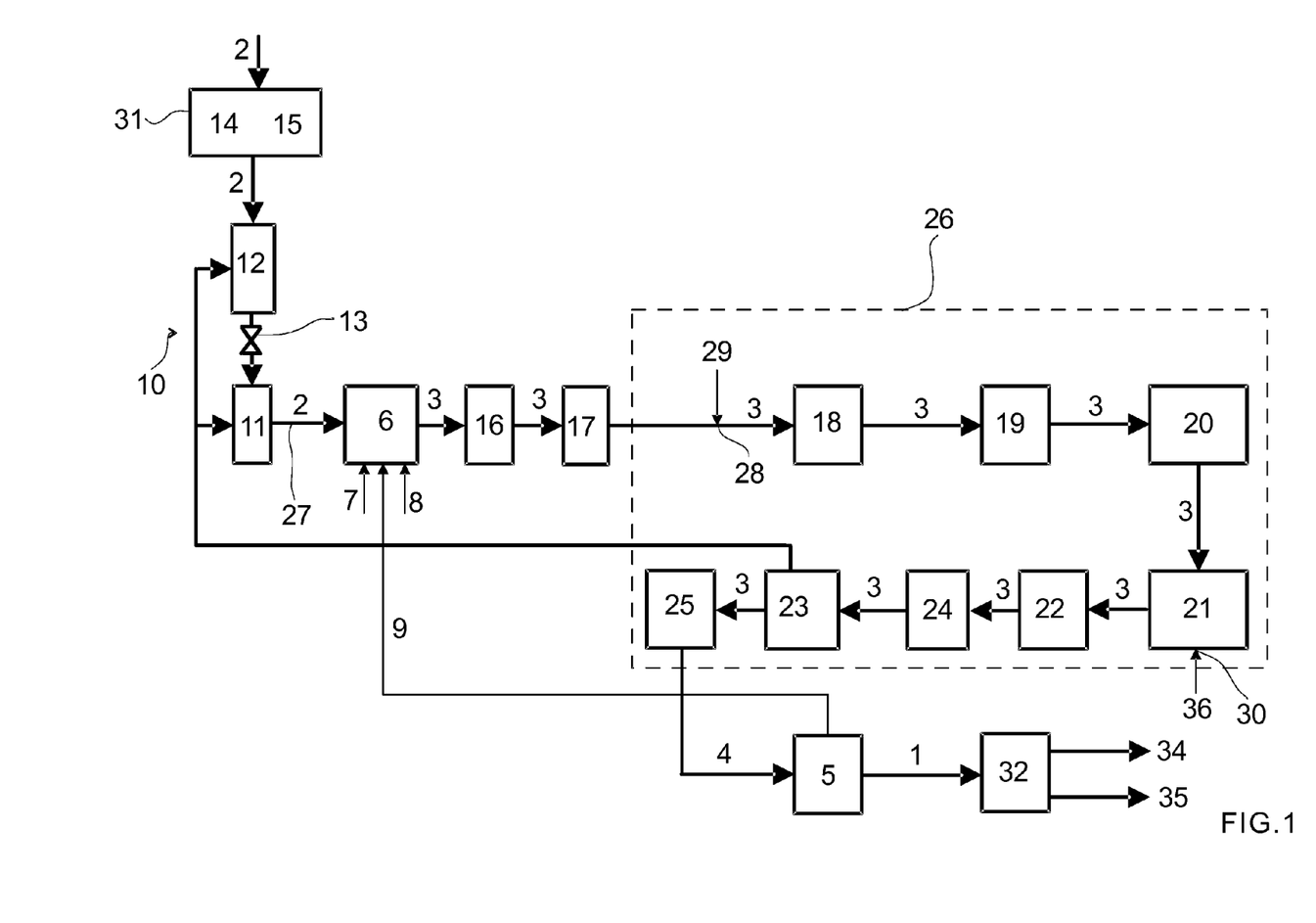
FIG. 1 presents in schematic view of an apparatus for producing liquid biofuel from solid biomass.

FIG. 1 presents an embodiment of the invention for producing a liquid hydro carbonaceous product 1 from solid biomass 2.

In the embodiment of FIG. 1 solid biomass 2 is gasified in a gasification step to produce raw synthesis gas 3 comprising carbon monoxide and hydrogen. Raw synthesis gas 3 means in this context that the synthesis gas can in addition to carbon monoxide and hydrogen comprise "impurities" such as carbon dioxide, methane, tar, and/or small particles such as ash and/or soot.

The raw synthesis gas 3 formed in gasification step in conditioned in consecutive conditioning steps to purify the raw synthesis gas 3 by using means 26 for conditioning of raw synthesis gas to at least partly remove "impurities" from the raw synthesis gas 3 and to obtain purified synthesis gas 4 having a molar ratio of hydrogen to carbon monoxide between 2.5 to 1 and 0.5 to 1, preferably to between 2.1 to 1 and 1.8 to 1, more preferably about 2 to 1. In the embodiment of FIG. 1 the conditioning steps comprise catalytic treatment, cooling, filtering, water-to-gas-reaction, scrubbing, ultra-purification and a guard-bed treatment.

The purified synthesis gas 4 is subjected to a Fischer-Tropsch type synthesis in a Fischer-Tropsch reactor 5 to produce a liquid hydro carbonaceous product 1 of the purified synthesis gas 4.

The gasifying step includes at least partial combustion of solid biomass 2 in a gasifier 6 to produce said raw synthesis gas 3 comprising carbon monoxide and hydrogen.

The gasifier 6 that is used comprises a fluidized bed gasifier (for example a circulating fluidized bed reactor or a bubbling fluidized bed reactor) for at least partial combustion of the solid biomass 2. The fluidized bed gasifier comprises a bed material that preferably, but not necessarily, comprises a mixture of dolomite and sand. Bed fluidization is carried out by fluidizing agents which are fed through a grid (not shown in the figures). Fuel, in this case solid biomass 2, is fed to the lower part of the fluidized bed. The interaction between the solid biomass 2, sand and dolomite decreases the amount of tar in the raw synthesis gas 3 produced by the fluidized bed gasifier. Dolomite lowers the amount of sulfur compounds in the raw synthesis gas 3 produced by the fluidized bed gasifier. Oxygen 7 and steam 8 having a temperature of about 200° C. and in addition possible also recycled tail gas 9 from the Fischer-Tropsch process is used as fluidizing agents in the gasifier. At least oxygen and steam are preferably, but not necessarily, mixed together before introducing them into the gasifier. Pure oxygen could melt the fuel ash and produce agglomerates and sintered cakes which would block the gasifier. The compounds of the solid biomass 2 will react with the steam endothermically generating carbon monoxide and hydrogen and the compounds of the solid biomass 2 will react with the oxygen exothermically generating carbon monoxide, carbon dioxide and additional steam. The result of this is a raw synthesis gas 3.

The solid biomass 2 is fed to the gasifier 6 by means of a lock hopper 10. The gasifier 6 is pressurized, for to example 10 to 20 bar, such as about 15 bar, and the solid biomass 2 must therefore be pressurized to this pressure before it can be fed into the gasifier 6. The lock hopper 10 is utilized for pressurizing the solid biomass 2 at least to the pressure prevailing in the gasifier 6. The lock hopper comprises basically two fuel silos (a first fuel feeding silo 11 and a second silo 12) on top of each other and a valve arrangement 13 arranged between the first fuel silo 12 and the second fuel feeding silo 11. The second fuel feeding silo 11 operates permanently at the pressure of the gasifier 6, and the pressure of the first fuel silo 12 fluctuates between atmospheric pressure, during loading with biomass 2, and pressure in the gasifier 6 during discharge to second fuel feeding silo 11 when the valve arrangement 13 between the first fuel silo 12 and the second fuel feeding silo 11 is opened for feeding pressurized biomass into the gasifier 6. The pressurizing gas used in the lock-hopper 11 is preferably, but not necessarily, carbon dioxide Since the second fuel feeding silo 11 has to be in a slightly higher pressure than the gasifier 6, there might be leakages of the pressurizing gas into the gasifier 6. By utilizing carbon dioxide the leakages into the process stream can be retracted from the raw synthesis gas 3 unlike if nitrogen would be utilized. Nitrogen is not a catalyst poison but it will act as inert gas eating up the capacity of the down stream equipment.

From the second fuel feeding silo 11 the pressurized solid biomass 2 is fed to the gasifier by means of a feed arrangement 27 for solid biomass such as screw conveyor that is arranged between the second fuel feeding silo 11 of the lock hopper 10 and the gasifier 6.

Before feeding the solid biomass to the first fuel feeding silo 12 of the lock hopper 10, the solid biomass 2 is pre-treated by crushing or by any other suitable method divided into particles that preferably, but not necessarily, have a size under 50 mm. In a preferred embodiment of the method of the invention the solid biomass 2 is pre-treated by crushing or by any other suitable method divided into particles that preferably, but not necessarily have a size under 50 mm prior feeding the solid biomass 2 into the upper fuel silo 12 of the lock hopper 10.

The solid biomass 2 can also be pre-treated by thermal drying. The drying is conducted prior feeding the solid biomass 2 into the upper fuel silo 12 of the lock hopper 10. In a preferred embodiment of the method of the invention the solid biomass 2 is pre-treated by thermal drying to a moisture content less than about 20%.

In the embodiments of FIGS. 1 to 4, the pre-treatment of the solid biomass 2 is performed with a biomass pre-treatment means 31 comprising a crusher 14 and/or dryer 15 arranged as part of the apparatus for producing liquid biofuel from solid biomass 2 as shown in the figures. Alternatively the pre-treatment of the solid biomass 2 can take place at least partly elsewhere.

The raw synthesis gas 3 produced in the gasifier 6 is treated in a first particle separator 16 preferably, but not necessarily, comprising a first cyclone which is arranged downstream of the gasifier 6. In the first particle separator 16 particles such as ash, char and bed material particle are separated in a particle separation step from the raw synthesis gas 3 and the separated particles are fed back into the gasifier 6.

In addition to the treatment in a first particle separator 16, the raw synthesis gas is treated in a second particle separator preferably, but not necessarily, comprising a second cyclone 17 which is arranged downstream of the first particle separator 16. The second particle separator 17 is utilized in a dust separation step for lowering the dust content of the raw synthesis gas 3. The purpose of the particle separation step in the first particle separator 16 and the dust separation step in the second particle separator 17 is to prepare the raw synthesis gas 3 for the following downstream conditioning steps between the gasification step and the Fischer-Tropsch type synthesis.

The conditioning of the raw synthesis gas is performed in consecutive conditioning steps by means of means 26 for conditioning the raw synthesis gas. The means 26 for conditioning the raw synthesis gas comprise several consecutive conditioning means. In the embodiments shown in FIGS. 1 to 4, the means 26 for conditioning the raw synthesis gas comprise a reformer 18, a cooler 19, a filter 20, a water-to-gas reactor 21, a scrubber 22, an ultra-conditioning means 23 and a guard bed 25. The means 26 for conditioning the raw gas may also comprise other devices that do not affect the composition of the raw synthesis gas, but only condition it for the following conditioning device. In the embodiments of FIGS. 1 to 4, a compressor 24 for raising the pressure of the raw synthesis gas that is arranged downstream of the scrubber 22 is an example of such conditioning device.

The conditioning includes a conditioning step in the form of catalytic treatment of the raw synthesis gas 3 in a reformer 18 for converting tar and methane present in the raw synthesis gas 3 into carbon monoxide and hydrogen. This catalytic process is preferably operated at about 900° C. and the catalysts are preferably nickel and/or novel metal based. Because tar and methane reforming are endothermic chemical reactions i.e. chemical reactions consuming thermal energy and lowering the temperature of the synthesis gas 3, the raw synthesis gas 3 is preferably heated prior feeding into the reformer 18. In a preferred embodiment of the invention the temperature of the raw synthesis gas 3 is raised by feeding oxygen into the stream of raw synthesis gas 3 prior feeding the raw synthesis gas 3 into the reformer 18. To prevent hotspots and ash melting, steam and possible also tail gas from the Fischer-Tropsch type synthesis are fed together with oxygen into the stream of raw synthesis gas 3.

The conditioning also includes cooling the raw synthesis gas 3 to about 250° C. in a cooler 19 after the catalytic treatment in the reformer 18.

After the raw synthesis gas is cooled in cooler 19, it is led to a conditioning step in the form of filtering step for filtering the raw synthesis gas 3 in a filter 20 for removing particles such as ash, soot, char and entrained bed material from the raw synthesis gas 3.

The conditioning also includes a conditioning step in the form of adjusting the molar ratio of hydrogen and carbon monoxide by a water-gas-shift reaction in a water-to-gas reactor 21 to between 2.5 to 1 and 0.5 to 1, preferably to between 2.1 to 1 and 1.8 to 1, more preferably to about 2 to 1 according to the following chemical formula:

$$CO + H_2O \leftrightarrow CO_2 + H_2$$

The target value of $H_2$ to CO is, as mentioned, about 2 to 1.

To achieve the needed hydrogen to carbon ratio and depending of the moisture content of the raw synthesis gas 3, steam 36 is preferably, but not necessarily, fed into the raw synthesis gas 3. The conditioning step that is performed in the water-to-gas reactor 21 is located downstream of the filter 20.

From the water-to-gas reactor 21 the raw synthesis gas is led to a scrubbing step for water scrubbing the raw synthesis gas 3 in a scrubber 22 to remove remaining solids and residual tar components but also HCl (hydrogen chloride), $NH_3$ (ammonia) and other components from the raw synthesis gas 3.

The conditioning includes also a conditioning step in the form of an ultra purification step performed in ultra purification means 23 for removing at least carbon dioxide and sulfur components from the raw synthesis gas 3. Target value for sulfur components is preferably below 20 ppb, more preferably below 10 ppb and for carbon dioxide preferably below 5 w-percent. The raw synthesis gas is led to the ultra purification means from the scrubber 22.

The ultra purification step for removing sulfur components, $CO_2$ (carbon dioxide), $H_2O$ (water), HCN (hydrogen cyanide), $CH_3Cl$ (methyl chloride), carbonyls, Cl (chloride) and $NO_x$ (nitrogen oxide) sulfur from the raw synthesis gas 3 can be performed by a physical cleaning process. Physical cleaning process makes use of methanol or dimethyl ether as the solvent and operates at 30 to 40 bar, for example at about 35 bar and cryogenic temperatures, −25° C. to −60° C. High pressure and low temperature increase the solubility of the species to be captured into the liquid solvent used to carry them away from the process. An example of a suitable process is the Rectisol® process by Lurgi AG.

Alternatively the ultra purification step for removing sulfur components, $CO_2$ (carbon dioxide), $H_2O$ (water), HCN (hydrogen cyanide), $CH_3Cl$ (methyl chloride), carbonyls, Cl (chloride) and $NO_x$ (nitrogen oxide) sulfur from the raw synthesis gas 3 can be performed by a chemical cleaning process. The chemical cleaning process can for example be amine washing of the raw synthesis gas 3.

In a preferred embodiment of the method of the invention the pressure of the raw synthesis gas is raised in a compressor 24 to about 30 to 40 bar for example to about 35 bar prior the ultra purification step.

The last step of the conditioning comprises guard bed reactor 25 where the raw product gas is directed after ultra purification. The guard bed comprises ZnO catalysts and active carbon. The purpose of the conditioning step performed in the guard bed rector 25 is to remove possible sulfur components from raw synthesis gas 3/purified synthesis gas 4. From the guard bed reactor 25 the purified synthesis gas 4 is directed to the Fischer-Tropsch reactor 5.

From Fisher-Tropsch 5 reactor the liquid hydro carbonaceous biofuel is led to a product upgrading step for product upgrading to obtain at least a diesel fraction 34 and at least a naptha fraction 35.

In a preferred embodiment of the method of the invention the method comprises a product upgrading step performed in a means for product upgrading 32 for upgrading of the liquid hydro carbonaceous biofuel obtained from the Fischer-Tropsch reactor to obtain at least a diesel fraction 34 and at least a naptha fraction 35. The term "naptha fraction" refers to a distilled hydrocarbon fraction, wherein the hydrocarbons consist essentially of hydrocarbons having a carbon chain length of 5 to 10 (designated $C_5$-$C_{10}$). The naphtha fraction hydrocarbons are those typically used as light fuels, solvents or raw materials e.g. for further processes based on steam cracking.

The term "diesel fraction" refers to a hydrocarbon fraction, wherein the hydrocarbons consist essentially of hydrocarbons typically having a carbon chain length of 11 to 20 (designated $C_{11}$-$C_{20}$). The diesel distillate fraction typically has a boiling point in the range of 150 to 400° C. and preferably 175 to 350° C. The diesel distillate hydrocarbons are those typically used as diesel fuels. It should be noted that since distillation does not provide an absolute cut off at a specific chain length, the various distillate fractions may contain insignificant amounts of hydrocarbons having a slightly lower or slightly higher carbon chain lengths. The cut off point in the distillation varies slightly depending on the intended use and the desired properties of the diesel distillate. Thus, a distillate fraction comprising a wider range of carbohydrates such as $C_9$ to $C_{22}$ or a narrower range of carbohydrates such as $C_{14}$ to $C_{18}$ should also be understood as a diesel distillate fraction.

Figure 2:
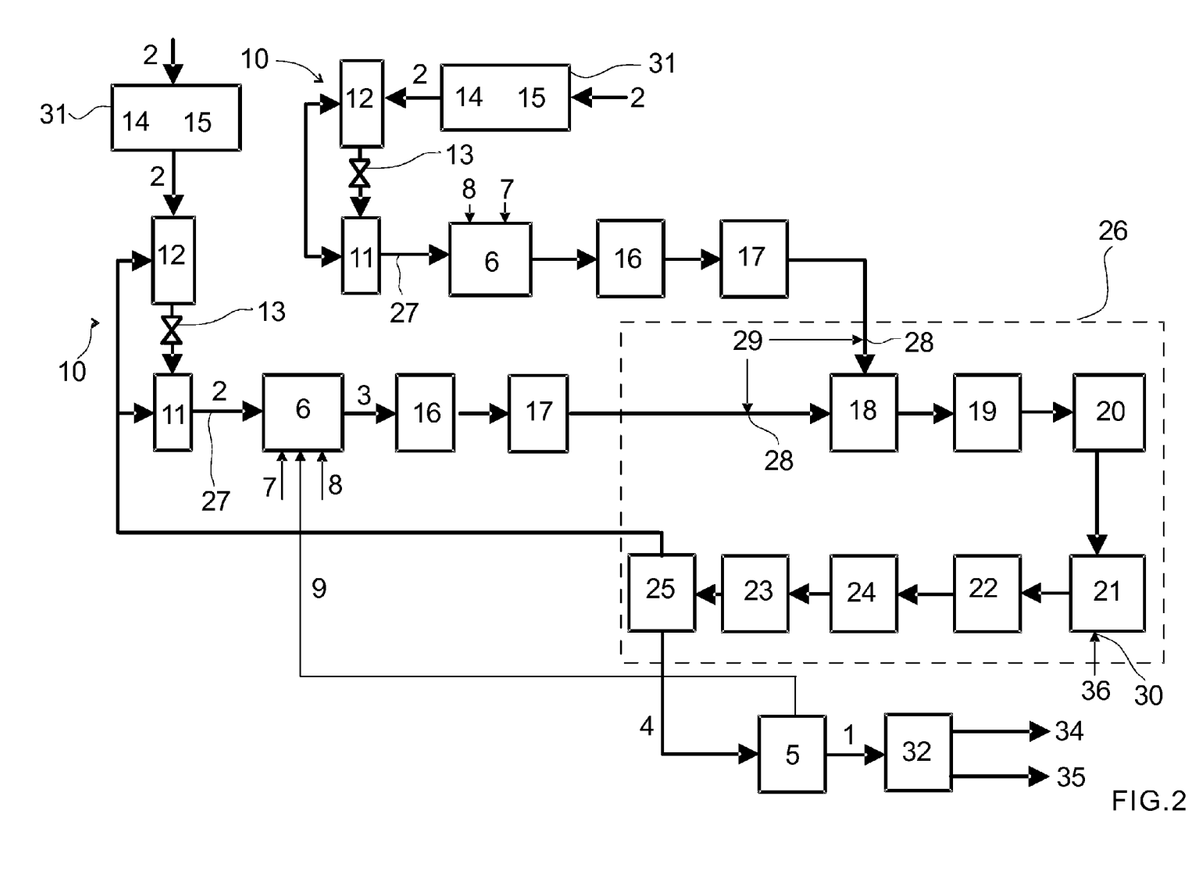
FIG. 2 presents in schematic view of another apparatus for producing liquid biofuel from solid biomass.
Figure 3:
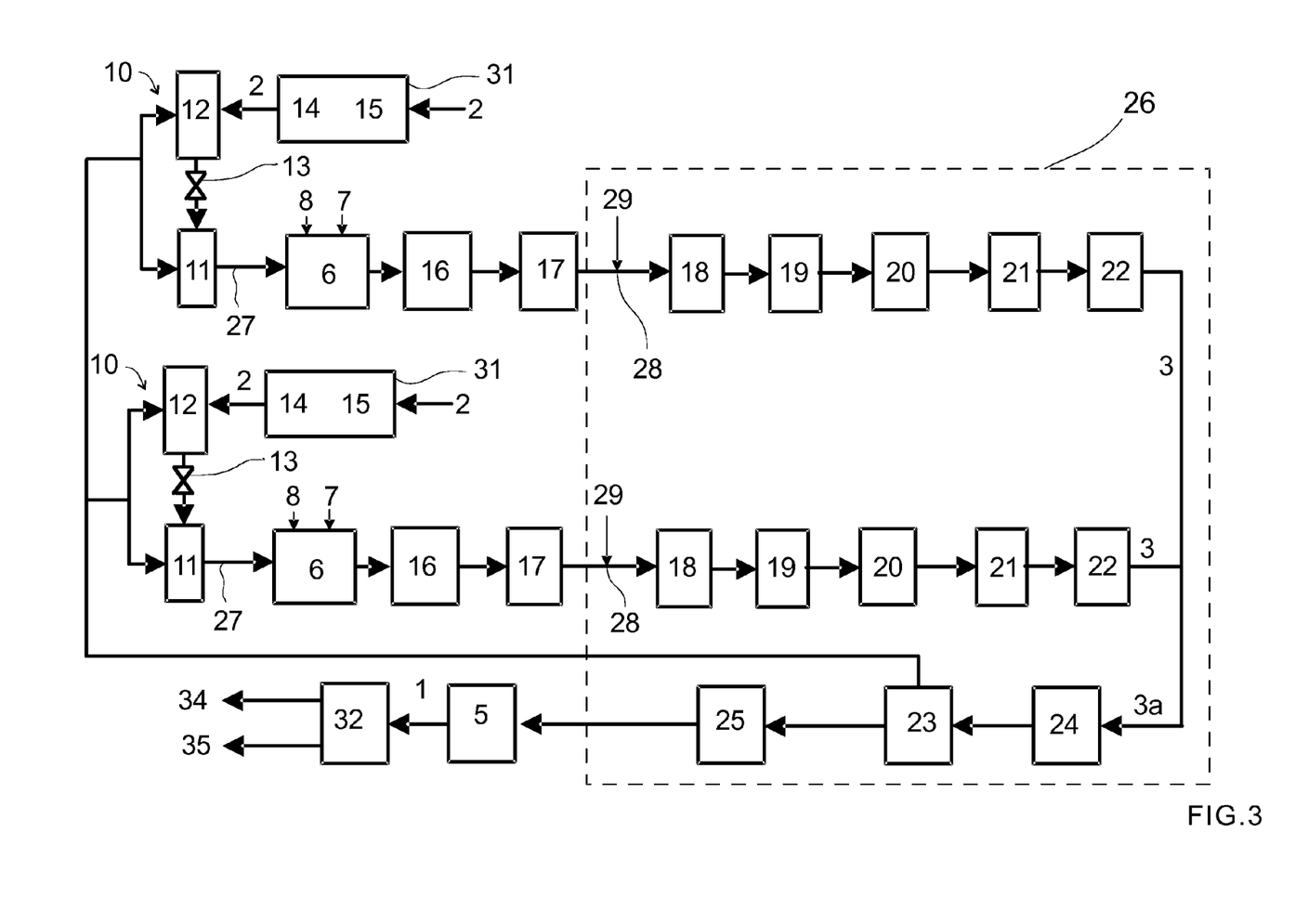
FIG. 3 presents in schematic view of third apparatus for producing liquid biofuel from solid biomass.
Figure 4:
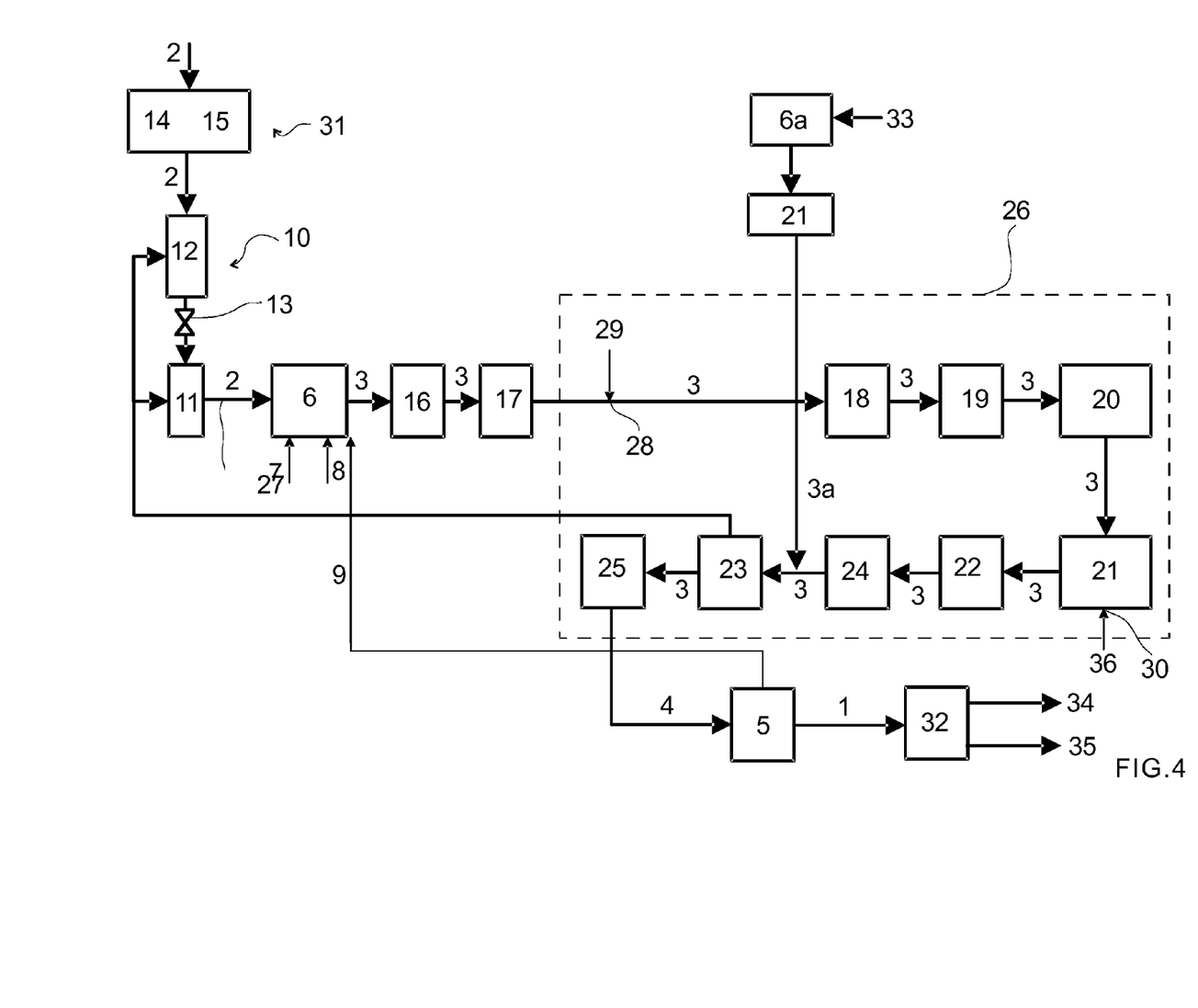
FIG. 4 presents in schematic view an apparatus for producing liquid biofuel from solid and liquid biomass.

In other embodiments of the invention several gasifiers 6 are used for producing raw synthesis gas 3. FIGS. 2 to 4 show such embodiments of the invention.

In the embodiment presented in FIG. 2 raw synthesis gas 3 is produced by two gasifiers 3 that gasify solid biomass 2. The raw synthesis gas produced by both of the gasifies is fed into the same means 26 for conditioning raw synthesis gas. This means, that only one conditioning means 26 is needed for both of the solid biomass gasifiers 6. In the embodiment presented in FIG. 1, the both gasifiers 6 have fuel feeding 10, 11, 12, 27 and biomass pre-treatment means 31 comprising of their own. The fuel feeding and pretreatment devices can also be combined, so that the fuel is treated in one fuel feeding and pretreatment device and the both gasifiers receive their fuel from this one device.

In the embodiment presented in FIG. 3 also two gasifiers 6 that gasify solid biomass 2 is used. The gasifiers 6 produce a raw synthesis gas 3 stream of their own that are treated partly separately in a means 26 for conditioning raw synthesis gas. The two separate and independent streams of raw synthesis gas 3 are combined prior feeding the combined stream of raw synthesis gas 3a into a common compressor 24 upstream of a common ultra purification means 23 and a common guard bed 25.

In FIG. 4, one gasifier 6 for producing raw synthesis gas 3 of solid biomass 2 is used and one gasifier 6a for producing raw synthesis gas 3a of liquid biomass 33 is used. (The liquid biomass 33 can for example contain at least one of the following: biomethanol, tall oil, black liquor, linguine, pyrolysis oil and glycerol. The raw synthesis gas 3 produced by the gasifier 6 for producing raw synthesis gas 3 of liquid biomass 33 is preferably, but not necessarily, connected for feeding a stream of raw synthesis gas 3a into the stream of raw synthesis gas 3 originating from the gasifier 6 for producing raw synthesis gas 3 of solid biomass 2 at a point situated after the reformer 18, the cooler 19, the filter 20, the water to gas shift reactor 21 and the scrubber 22. This is possible, because the raw synthesis gas 3 produced by the gasifier 6 for producing raw synthesis gas 3 of liquid solid biomass 2 contains less impurity such as tar and ash. In a preferred embodiment of the invention the gasifier 6 for producing raw synthesis gas 3 of liquid solid biomass 2 comprises an entrained flow gasifier.

If a gasifier 6a for producing raw synthesis gas 3a of liquid biomass 33 is used the gasifier 6a is preferably, but not necessarily, an entrained flow gasifier in which the temperature is between 900 and 1200° C., preferably about 1000° C. Because of the high temperature the raw synthesis gas 3a produced by the gasifier 6a does not contain tar or methane, which means that no reformation of the raw synthesis gas 3a produced by the gasifier 6a is needed. The raw synthesis gas 3a does neither contain solid particles, which means that filtering can be considered unnecessary. This raw synthesis gas 3a contains mainly CO₂ (carbon dioxide), CO (carbon monoxide), and H (hydrogen).

The raw synthesis gas 3a produced by the gasifier 6a is preferably, but not necessarily, subjected to a water to gas shift reaction step in a water-to-gas shift reactor 21 for adjusting the molar ratio of hydrogen and carbon monoxide to between 2.5 to 1 and 0.5 to 1, preferably to between 2.1 to 1 and 1.8 to 1, more preferably to about 2 to 1. The raw synthesis gas 3a produced by the gasifier 6a is preferably, but not necessarily, cooled to about 250° C. prior feeding the raw synthesis gas into the water-to-gas shift reactor 21.

In a preferred embodiment of the invention three gasifiers 6 for producing raw synthesis gas 3 of solid biomass 2 are used and one gasifier 6a for producing raw synthesis gas 3a of liquid biomass 33 is used.

It is apparent to a person skilled in the art that as technology advances, the basic idea of the invention can be implemented in various ways. The invention and its embodiments are therefore not restricted to the above examples, but they may vary within the scope of the claims.

LIST OF REFERENCE NUMERALS

1. Liquid hydro carbonaceous product
2. Solid biomass
3. Raw synthesis gas
4. Purified synthesis gas
5. Fischer-Tropsch reactor
6. Gasifier
7. Oxygen
8. Stream
9. Tail gas
10. Lock hopper
11. Lower fuel feeding silo
12. Upper fuel silo
13. Valve arrangement
14. Crusher
15. Dryer
16. First particle separator
17. Second particle separator
18. Reformer
19. Cooler
20. Filter
21. Water-to-gas shift reactor
22. Scrubber
23. Ultra purification means
24. Compressor
25. Guard bed reactor
26. Means for conditioning of the raw synthesis gas
27. Feed arrangement for solid biomass
28. Oxygen feeding means
29. Oxygen
30. Steam feeding means
31. Solid biomass pre-treatment means
32. Means for product upgrading
33. Liquid biomass
34. Diesel fraction
35. Naptha fraction
36. Steam

The invention claimed is:

1. A method for producing liquid hydro carbonaceous product (1) such as biofuel from solid biomass (2), characterized by the method comprising:
   a gasifying step for gasifying solid biomass (2) in a fluidized bed gasifier (6) at 750-850° C. to produce raw synthesis gas (3),
   conditioning of the raw synthesis gas (3) to purify the raw synthesis gas (3) to obtain purified synthesis gas (4) having a molar ratio of hydrogen to carbon monoxide between 2.5 to 1 and 0.5 to 1, preferably to between 2.1 to 1 and 1.8 to 1, more preferably about 2 to 1, wherein one of the conditioning steps is a catalytic treatment in a reformer (18), one of the conditioning steps is a water-gas-shift reaction in a water-to-gas shift reactor (21) and the last conditioning step is sulfur removal in a guard bed and
   subjecting purified synthesis gas (4) to a Fischer-Tropsch synthesis in a Fischer-Tropsch reactor (5) to produce liquid hydro carbonaceous product (1).

2. The method according to claim 1, characterized
   in that the gasification step includes gasifying of solid biomass (2) in a gasifier (6) comprising a fluidized bed reactor, and
   in that oxygen (7) and steam (8) are used as fluidizing medium in the fluidized bed reactor.

3. The method according to claim 2, characterized by using in addition tail gas (9) from the Fischer-Tropsch reactor (5) as gasification and fluidizing medium in the fluidized bed reactor.

4. The method according to any of the claim 1, characterized by using a lock hopper (10) for feeding solid biomass (2) to the gasifier (6).

5. The method according to any of the claim 1, characterized by feeding the raw synthesis gas (3) into a first particle separator (16) for performing a particle separation step for separating particles such as ash, char and bed material from the raw synthesis gas (3).

6. The method according to claim 5, characterized by feeding the raw synthesis gas (3) from the first particle separator (16) to a second particle separator (17) for performing a dust separation step lowering the dust content in the raw synthesis gas (3).

7. The method according to any of the claim 1, characterized by the catalytic treatment of the raw synthesis gas (3) in the reformer (18) for converting tar and methane present in the raw synthesis gas (3) into carbon monoxide and hydrogen.

8. The method according claim 1, characterized by the conditioning includes lowering the temperature of the raw synthesis gas (3) to about 250° C. in a cooler (19).

9. The method according claim 1, characterized by the conditioning of the raw synthesis gas (3) including a filtering step for filtering the raw synthesis gas (3) in a filter (20) to remove particles such as ash, entrained bed material, and soot from the raw synthesis gas (3).

10. The method according to claim 1, characterized by the conditioning of the raw synthesis gas (3) including subjecting the raw synthesis gas (3) to a water-gas-shift reaction in a water-to-gas shift reactor (21) for adjusting the molar ratio of hydrogen and carbon monoxide to between 2.5 to 1 and 0.5 to 1, preferably to between 2.1 to 1 and 1.8 to 1, more preferably to about 2 to 1.

11. The method according to claim 1, characterized by the conditioning of the raw synthesis gas (3) including a scrubbing step for scrubbing the raw synthesis gas (3) to remove solids and tar components from the raw synthesis gas (3).

12. The method according to claim 1, characterized by the conditioning of the raw synthesis gas (3) including a ultra purification step for removing sulfur components, $CO_2$ (carbon dioxide), $H_2O$ (water), HCN (hydrogen cyanide), $CH_3Cl$ (methyl chloride), carbonyls, Cl (chloride) and $NO_x$ (nitrogen oxide) from the raw synthesis gas (3).

13. The method according to claim 12, characterized in that the ultra purification step includes a physical cleaning process in which methanol or dimethyl ether is used as a solvent at a pressure of about 30 to 40 bar such as about 35 bar and at a temperature of about −25° C. to −60° C.

14. The method according to claim 13, characterized by the conditioning includes lowering the temperature of the raw synthesis gas (3) to about 250° C. in a cooler (19).

15. The method according to claim 12, characterized in that the ultra purification step includes a chemical cleaning process in which amine is used.

16. The method according to claim 1, characterized by the method includes leading the raw synthesis gas (3) through at least one guard bed reactor (25) comprising zinc oxide catalysts and active carbon for removing sulfur species from the raw synthesis gas (3).

17. The method according to any of the claim 1, characterized by using several gasifiers (6) for producing raw synthesis gas (3) of which at least one is a gasifier (6) for producing raw synthesis gas (3) from solid biomass (2) and of which at least one is a gasifier (6a) for producing raw synthesis gas (3a) from liquid solid biomass.

18. The method of claim 1, wherein the catalytic treatment in a reformer (18) is the only catalytic treatment in a reformer of the method.

19. An apparatus for producing liquid hydro carbonaceous product (1) such as biofuel from solid biomass (2), characterized in that the apparatus comprises
a fluidized bed gasifier (6) operating at 750-850° C. for gasifying solid biomass (2) to produce raw synthesis gas (3),
means for conditioning of the raw synthesis gas (3) to obtain purified synthesis gas (4) having a molar ratio of hydrogen to carbon monoxide between 2.5 to 1 and 0.5 to 1, preferably to between 2.1 to 1 and 1.8 to 1, more preferably about 2 to 1, comprising catalytic treatment of the raw synthesis gas in a reformer (18), adjusting the molar ratio of hydrogen and carbon monoxide in a water-gas-shift reactor (21) and as a last conditioning step sulfur removal in a guard bed and
a Fischer-Tropsch reactor (5) for subjecting the purified synthesis gas (4) to a Fischer-Tropsch synthesis to produce liquid hydro carbonaceous product (1) of the purified synthesis gas (4).

20. The apparatus according to claim 19, characterized in that the gasifier (6) includes a fluidized bed reactor, and in that the gasifier (6) includes means for feeding oxygen (7) and steam (8) into the gasifier (6) for using oxygen (7) and steam (8) as fluidizing medium in the fluidized bubbling bed reactor.

21. The apparatus according to claim 20, characterized in that the apparatus includes means for feeding tail gas from the Fischer-Tropsch reactor (5) into the gasifier (6) for using gas from the Fischer-Tropsch reactor (5) as fluidizing medium in the fluidized bed reactor.

22. The apparatus according to claim 19, characterized by comprising a lock hopper (10) for feeding solid biomass (2) to the gasifier.

23. The apparatus according to claim 19, characterized by comprising solid biomass pre-treatment means (31) for drying the solid biomass (2) to a moisture content under 20% and/or for fine-dividing the solid biomass (2) to feedstock being less than 50 mm in particle size.

24. The apparatus according to claim 19, characterized by a first particle separator (16) for separating particles such as ash, char and bed material particles from the raw synthesis gas (3).

25. The apparatus according to claim 19, characterized by a second particle separator (17) for separating dust from the raw synthesis gas (3).

26. The apparatus according to claim 19, characterized by the reformer (18) for catalytic treatment of the raw synthesis gas (3) for converting tar and methane present in the raw synthesis gas (3) into carbon monoxide and hydrogen.

27. The apparatus according to claim 19, characterized by a cooler (19) for lowering the temperature of the raw synthesis gas (3) to about 250° C.

28. The apparatus according to claim 19, characterized by a filter (20) for filtering ash, entrained bed material and/or soot from the raw synthesis gas (3).

29. The apparatus according to claim 19, characterized by a water-gas-shift reactor (21) for adjusting the molar ratio of hydrogen and carbon monoxide in the raw synthesis gas (3) to between 2.5 to 1 and 0.5 to 1, preferably to between 2.1 to 1 and 1.8 to 1, more preferably to about 2 to 1.

30. The apparatus according to claim 19, characterized by a scrubber (22) for removing solids and tar components from the raw synthesis gas (3).

31. The apparatus according to claim 19, characterized by ultra purification means (23) for removing sulfur components, $CO_2$ (carbon dioxide), $H_2O$ (water), HCN (hydrogen cyanide), $CH_3Cl$ (methyl chloride), carbonyls, Cl (chloride) and $NO_x$ (nitrogen oxide) from the raw synthesis gas (3).

32. The apparatus according to claim 31, characterized by a compressor (24) for raising the pressure of the raw synthesis gas (3) to about 30 to 40 bar such as about 35 bar pressure before leading the raw synthesis gas (3) into the ultra purification means (23).

33. The apparatus according to claim 19, characterized by a guard bed reactor (25) for removing sulfur species.

34. The apparatus according to claim 19, characterized by several gasifiers (6) for producing raw synthesis gas (3) of which at least one is a gasifier (6) for producing raw synthesis gas (3) of solid biomass (2) and of which at least one is a gasifier (6a) for producing raw synthesis gas (3a) of liquid solid biomass.

35. The apparatus of claim 19, wherein the reformer (18) is the only reformer of the apparatus.

* * * * *